(12) United States Patent
Guo et al.

(10) Patent No.: US 9,251,612 B2
(45) Date of Patent: Feb. 2, 2016

(54) OPTIMAL DYNAMIC SEAM ADJUSTMENT SYSTEM AND METHOD FOR IMAGE STITCHING

(71) Applicant: National Chiao Tung University, Hsinchu (TW)

(72) Inventors: Jiun-In Guo, Hsinchu (TW); Hsiu-Cheng Chang, Tainan (TW); Cheng-An Chien, Taipei (TW); Kai-Chen Huang, New Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 57 days.

(21) Appl. No.: 14/219,355

(22) Filed: Mar. 19, 2014

(65) Prior Publication Data
US 2015/0172620 A1    Jun. 18, 2015

(30) Foreign Application Priority Data

Dec. 16, 2013   (TW) .............................. 102146374 U (51) Int. Cl.
*H04N 5/262* (2006.01)
*G06T 11/60* (2006.01)

(52) U.S. Cl.
CPC ....... *G06T 11/60* (2013.01); *G06T 2207/10004* (2013.01); *G06T 2207/20221* (2013.01)

(58) Field of Classification Search
CPC ...................................................... H04N 5/262
USPC ................ 348/659, 660, 218.1; 382/284–287
See application file for complete search history.

(56) References Cited

U.S. PATENT DOCUMENTS

| 6,657,667 B1 * | 12/2003 | Anderson ................ 348/333.12 |
| 6,813,391 B1 * | 11/2004 | Uyttendaele et al. ......... 382/284 |
| 2006/0078224 A1 * | 4/2006 | Hirosawa ...................... 382/284 |
| 2008/0056612 A1 * | 3/2008 | Park et al. ..................... 382/284 |
| 2012/0314945 A1 * | 12/2012 | Cha et al. ...................... 382/167 |
| 2013/0259401 A1 * | 10/2013 | Ohki et al. .................... 382/284 |
| 2014/0111605 A1 * | 4/2014 | Guo et al. ........................ 348/36 |
| 2014/0294287 A1 * | 10/2014 | Guo et al. ..................... 382/154 |
| 2015/0070523 A1 * | 3/2015 | Chao .......................... 348/218.1 |
| 2015/0071612 A1 * | 3/2015 | Ruegg et al. .................. 386/278 |

* cited by examiner

*Primary Examiner* — Paulos M Natnael
(74) *Attorney, Agent, or Firm* — Muncy, Geissler, Olds & Lowe, P.C.

(57) ABSTRACT

An optimal dynamic seam adjustment system for image stitching includes an image obtaining module, a feature difference calculation module and a dynamic seam module. The image obtaining module obtains at least two images to be stitched, which have at least one overlapping area divided into a plurality of pixels arranged in a plurality of pixel columns and a plurality of pixel rows. The feature difference calculation module calculates a feature difference value for each pixel within the overlapping area. The dynamic seam module establishes a plurality of dynamic seam routes started from a top end of the overlapping area, so as to find an optimal dynamic seam route based on the feature difference value, wherein each dynamic seam route is composed of a plurality of pixels.

27 Claims, 11 Drawing Sheets

OPTIMAL DYNAMIC SEAM ADJUSTMENT SYSTEM AND METHOD FOR IMAGE STITCHING

BACKGROUND OF THE INVENTION

1. Field of the Invention

The present invention relates to the technical field of image stitching and, more particularly, to an optimal dynamic seam adjustment system and method for image stitching.

2. Description of Related Art

Figure 1:
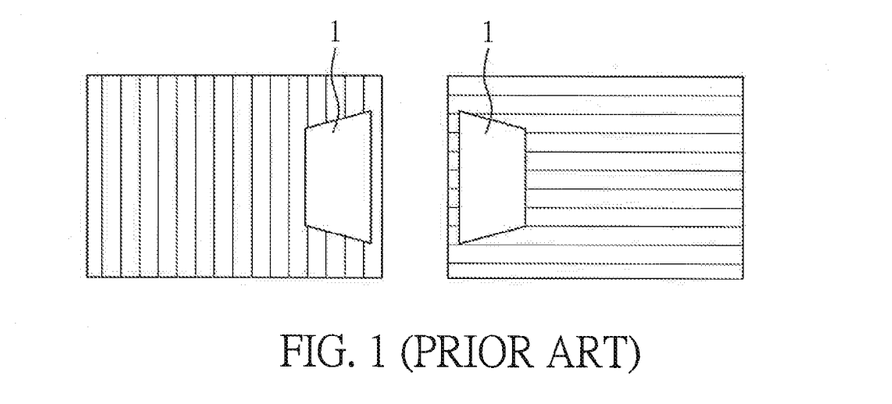
FIG. 1 is a schematic chart of a typical image stitching.
Figure 2:
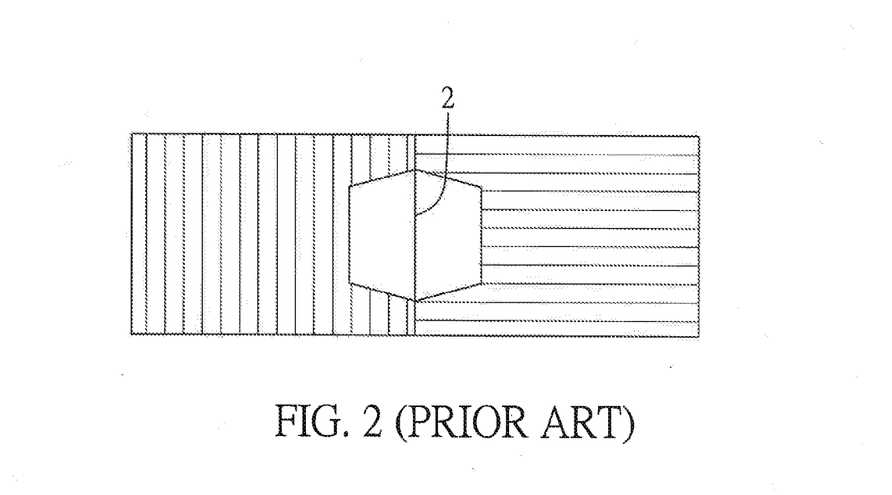
FIG. 2 is a schematic view of a result of typical image stitching.

With the advance of computer technology, people have expected that the image or video quality becomes better and better. Currently, a popular photographing skill is to take multiple pictures and stitch them to form a panoramic image so as to obtain a wider picture in image. However, the seam between two images is typically not stitched in perfect due to the different image colors and object arrangements caused by the different video sources. As show in FIG. 1, there are two images to be stitched. The two images are taken at different photographing angles, resulting in different angles for the same object 1. The stitched result is shown in FIG. 2. For the distant landscape, the stitching affection is insignificant, but for a near object, it may cause that the pictures are not continuous in the seam 2. Thus, a successful image stitching is essentially decided by the seam selection.

Currently, there are various image processing methods available in image stitching and seam adjustment. However, most of the methods require a complicated process and thus, due to the high complexity, it is necessary to take a large amount of time and cost. In addition, for the stitching of videos, the cost is much higher than that of still images.

Therefore, it is desirable to provide an improved system and method to mitigate and/or obviate the aforementioned problems and find an optimal seam route with simplicity and lower cost.

SUMMARY OF THE INVENTION

An object of the present invention is to provide an optimal dynamic seam adjustment system and method for image stitching. The system is used to stitch still images, and includes: an image obtaining module for obtaining at least two images to be stitched, wherein the images to be stitched have at least one overlapping area and the overlapping area is divided into a plurality of pixels arranged in a plurality of pixel columns and a plurality of pixel rows; a feature difference calculation module for calculating a feature difference value for each pixel within the overlapping area; and a dynamic seam module for establishing a plurality of dynamic seam routes started from a top end of the overlapping area, so as to find an optimal dynamic seam route based on the feature difference value, wherein each dynamic seam route is composed of a plurality of pixels.

Another object of the present invention is to provide an optimal dynamic seam adjustment system and method for image stitching. The system is used to stitch videos, and includes: a video obtaining module for obtaining at least two videos to be stitched, wherein each video has a plurality of images so as to stitch several image sets, each image set having at least one overlapping area of the same size, the overlapping area being divided into a plurality of pixels arranged in a plurality of columns and a plurality of rows; a feature difference calculation module for calculating a feature difference value for each pixel position within the overlapping area of a current image set to be stitched; and a dynamic seam module for establishing a plurality of dynamic seam routes started from a top end of the overlapping area of the current image set to be stitched, so as to find an optimal dynamic seam route based on the feature difference value of the current image set to be stitched and the optimal dynamic seam route of a previous stitched image set, wherein each dynamic seam route is composed of a plurality of pixels.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
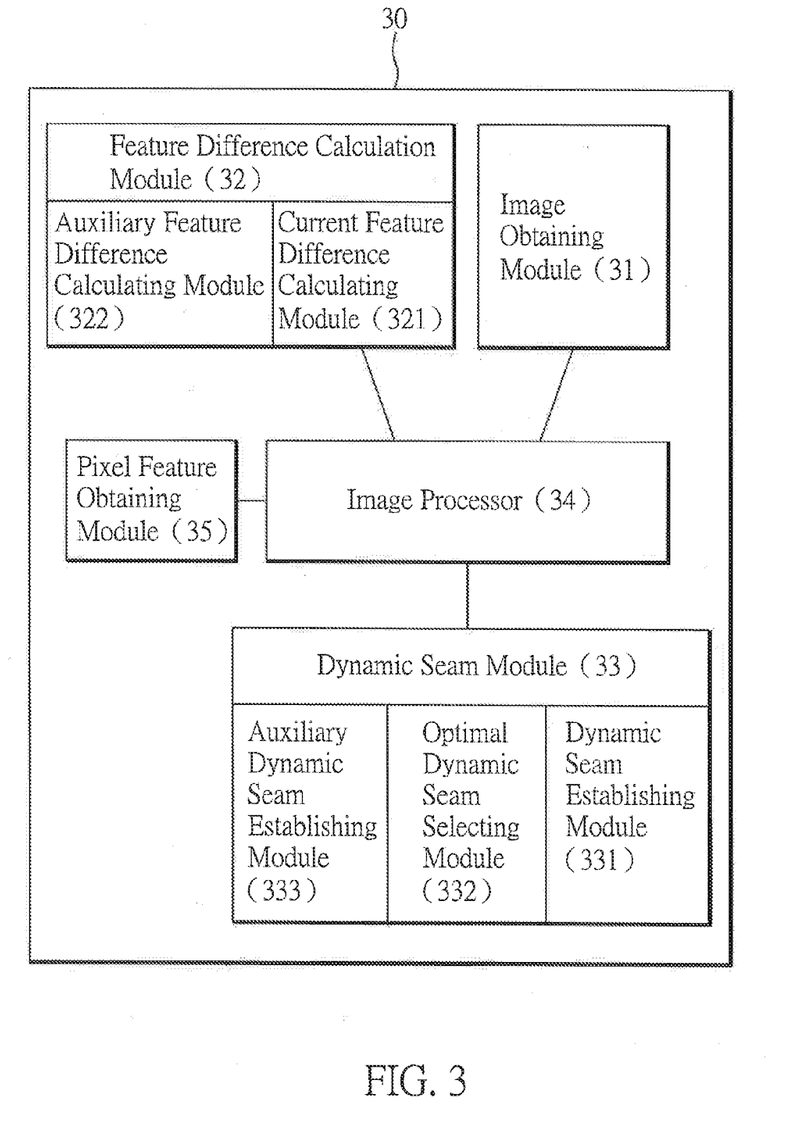
FIG. 3 is a schematic diagram of an optimal dynamic seam adjustment system for still image stitching according to an embodiment of the invention.

FIG. 3 is a schematic diagram of an optimal dynamic seam adjustment system 30 for still image stitching according to an embodiment of the invention. The system 30 is essentially used to stitch still images, and includes an image obtaining module 31, a feature difference calculation module 32, a dynamic seam module 33, an image processor 34, and a pixel feature obtaining module 35. The image processor 34 of the system 30 is connected to all of the modules for controlling their operations. The image processor 34 is preferably a computer or a main processor, along with a computer readable medium for performing an image processing.

The image obtaining module 31 is preferably a camera or an input interface. When the module 31 is a camera, at least two images to be stitched are taken by the camera. When the module 31 is an input interface, the input interface has an input end, so that the image processor 34 can use the input end to obtain at least two image files to be stitched.

The feature difference calculation module 32 is performed by the image processor 34 for calculating a feature difference value of the images. The module 32 has a current feature difference calculating module 321 and an auxiliary feature difference calculating module 322.

The dynamic seam module 33 is performed by the image processor 34 to establish or find one or more dynamic seam routes in the images to be stitched. The module 33 has a dynamic seam establishing module 331 for establishing a plurality of dynamic seam routes, an optimal dynamic seam selecting module 332 for selecting an optimal dynamic seam route from the established routes, and an auxiliary dynamic seam establishing module 333.

The configuration of the modules is for illustrative purpose only, but not limited to it. For example, the modules can be integrated into one module.

FIG. 4(*a*) is a flowchart of an optimal dynamic seam adjustment method for still image stitching according to a first embodiment of the invention. As shown in FIGS. 3 and 4(*a*), the flowchart of FIG. 4(*a*) is suitable for a still image stitching and preferably performed by the image processor 34. For clear description of the invention, the image processor 34 is used to perform the flowchart as follows. First, step S41 is executed such that the image processor 34 uses the image obtaining module 31 to obtain at least two images to be stitched. The images to be stitched have at least one overlapping area, and the overlapping area is divided into a plurality of pixels arranged in a plurality of pixel columns and rows. The image obtaining process is referred to the aforementioned description. In this step, the images have an overlapping area, while selecting and optimizing the overlapping area is not critical in the invention, so that the overlapping area in the invention is treated as a determined region.

Figure 4A:
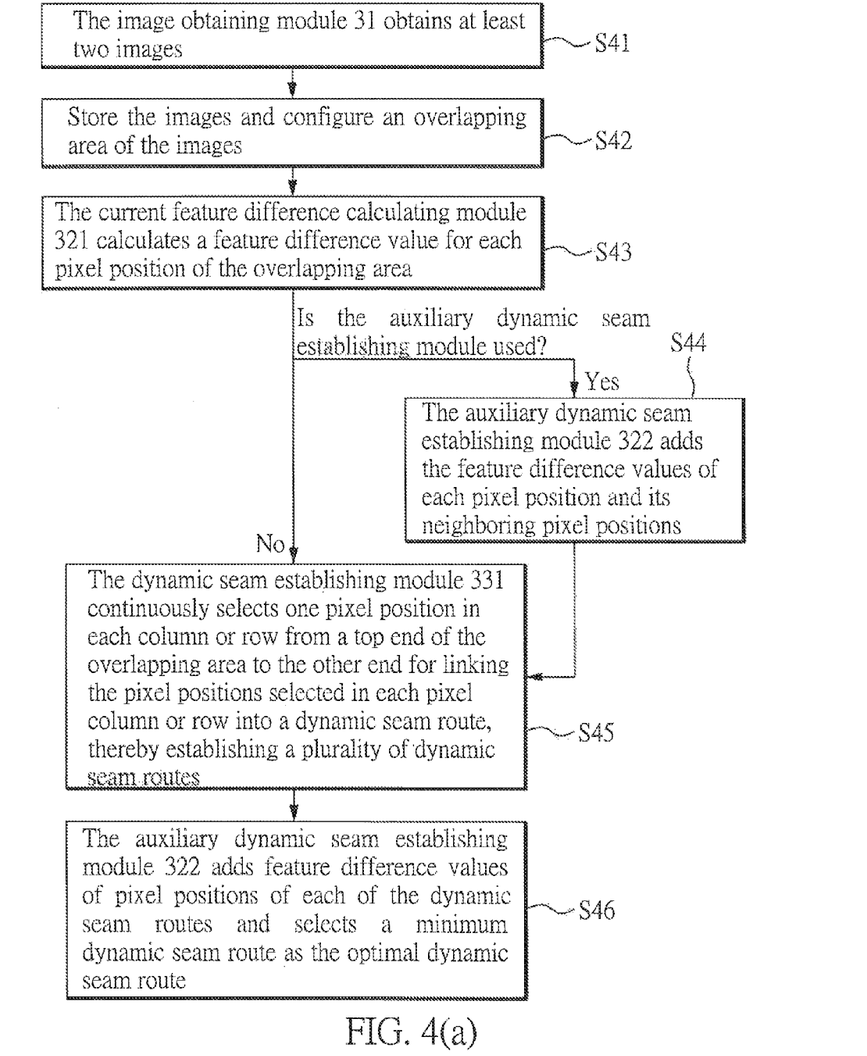
FIG. 4(a) is a flowchart of an optimal dynamic seam adjustment method for still image stitching according to an embodiment of the invention.
Figure 4B:
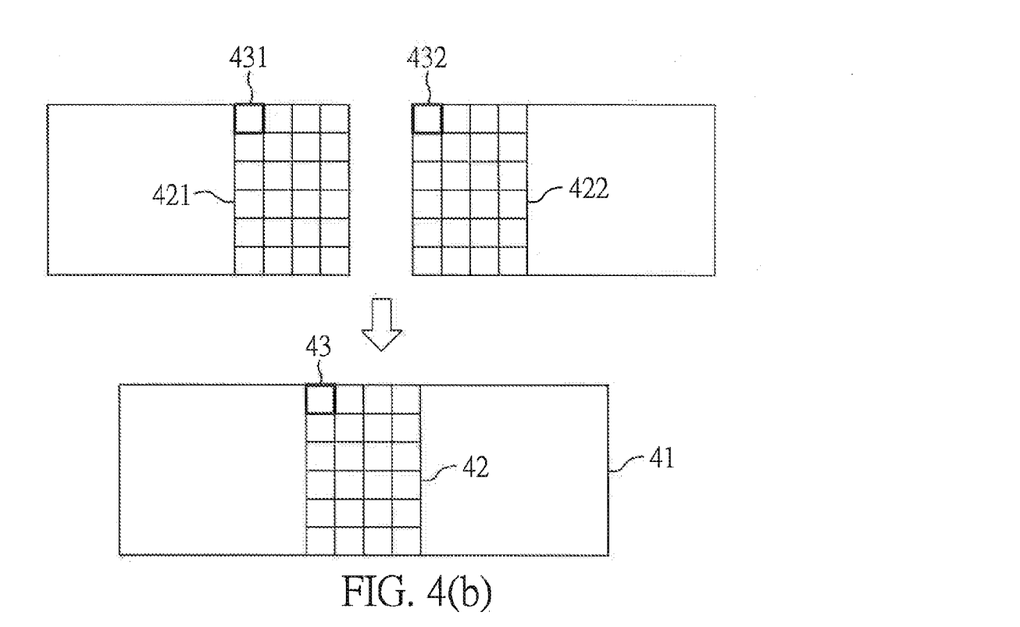
FIG. 4(b) is a schematic chart of stitching still images of FIG. 4(a) according to an embodiment of the invention.

After the images to be stitched are obtained, the image processor 34 stores the images (step S42), and then step S43 is executed, such that the image processor 34 uses the feature difference calculation module 32 to calculate a feature difference value for each pixel position within the overlapping area of the images. The feature difference value indicates a pixel's luminance or chrominance, or other differentiable features. Further, the image processor 34 uses the pixel feature obtaining module 35 to obtain and store a feature of the pixel on each pixel position within the overlapping area of each image. Next, the image processor 34 uses the current feature difference calculating module 321 of the feature difference calculation module 32 to calculate a current feature difference value for each pixel position within the overlapping area. For example, as shown in FIG. 4(*b*), if there are two images at left and right to be stitched into one image 41, the two images have an overlapping area 42, i.e., an overlapping of a right area 421 in the left image and a left area 422 in the right image. The overlapping area 42 contains a plurality of pixel positions, such as a pixel position 43, and in this case each of the pixel positions 431 and 432 corresponding to the pixel position 43 in the respective left and right images has a pixel and a feature value of the pixel. Accordingly, the current feature difference calculating module 321 calculates the feature values of the two pixels in order to obtain a feature difference value of the pixels on the pixel positions 431 and 432 respectively of the left image and the right image. Namely, the current feature difference calculating module 321 calculates a current feature difference value for each pixel position corresponding to that in two images based on the following equation, where each pixel position can be mapped onto a (x, y) coordinate of an image with a plurality of pixels arranged in a matrix form, for x, y are each an integer. The equation is expressed as:

$$\mathrm{Diff}(x,y)=|Y\_curL(x,y)-Y\_curR(x,y)|,$$

where Diff(x, y) indicates a current feature difference value on a (x, y) position in an overlapping area, Y_curL(x, y) indicates a current feature value of a pixel on the (x, y) position in the overlapping area of a left image, and Y_curR (x, y) indicates a current feature value of a pixel on the (x, y) position in the overlapping area of a right image. In this embodiment, the current feature difference value is used as a feature value of the pixel on the (x, y) position, such that the image processor 34 can obtain the feature difference values on each position in the overlapping area. In addition, the invention is not limited to the left and right image stitching. Alternatively, an upper and lower image stitching can also be performed.

After the feature difference value of each pixel position within the overlapping area is obtained, step S45 is executed such that the image processor 34 can use the dynamic seam establishing module 331 of the dynamic seam module 33 to continuously select one pixel position in each pixel column or row from one side (such as a top end) of the overlapping area to the other side (such as a bottom end), thereby linking the pixel positions selected in each pixel column or row into a dynamic seam route, as shown in FIG. 4(*c*). The overlapping area (43) are regarded as six rows, each row having four pixel positions, and the dynamic seam establishing module 331 can obtain six pixel positions to form the dynamic seam route after one pixel position is selected from each of the six pixel rows. Thus, the dynamic seam establishing module 331 can establish a plurality of dynamic seam routes. It is noted that the pixel number of the overlapping area is for illustrative purpose only, but not limited to it. Next, step 846 is executed such that the image processor 34 uses the optimal seam selecting module 332 to add the feature difference values of the pixel positions of each of the dynamic seam routes. When the feature difference values of the pixel positions are getting higher, it indicates that two images also have higher difference on the pixel positions, so that the pixel positions are not preferred to be selected as a dynamic seam. Thus, the optimal dynamic seam selecting module selects one dynamic seam route with a minimum sum of the feature difference values of the pixel positions. As shown in FIG. 4(*c*), when the dynamic seam route 44 comprised of the pixel positions 441-446 has a minimum sum of the feature difference values among all the dynamic seam routes, it is regarded as the optimal dynamic seam route, so as to accomplish the first embodiment of the invention.

Figure 4C:
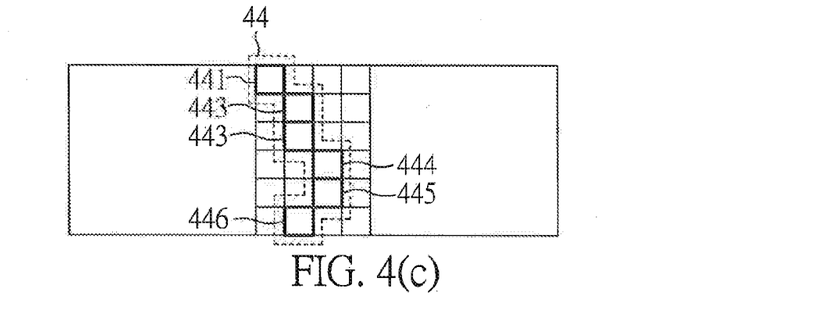
FIG. 4(c) is a schematic chart of establishing dynamic seam routes of FIG. 4(a) according to an embodiment of the invention.
Figure 4D:
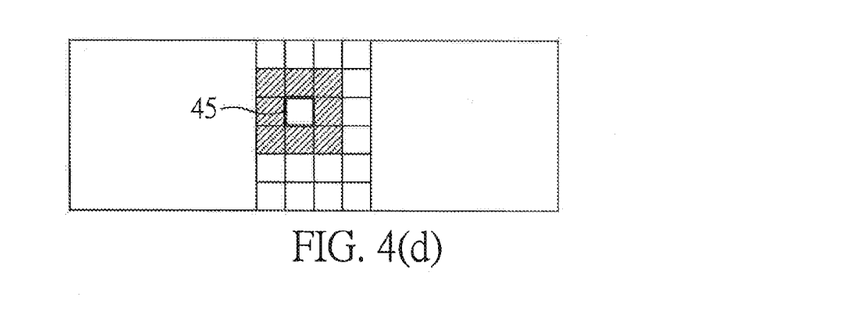
FIG. 4(d) is a schematic diagram of corrected feature difference values of FIG. 4(a) according to an embodiment of the invention.

In addition, in the first embodiment of the invention, step S44 can be inserted after step S43 so as to have a more accurate feature difference value. The image processor 34 uses the auxiliary feature difference calculating module 322 of the feature difference calculation module 32 to add the feature difference values of each pixel position and its neighboring pixel positions in the overlapping area to obtain an added result for use as the basis of steps S45 and S46 in calculation. The neighboring pixel positions are preferably the n×n neighboring pixel positions centered at said pixel position as auxiliary in calculating the feature difference value, where n is an odd number. For example, suppose that the pixel position (x, y) is targeted and the 3×3 neighboring pixel positions are configured as auxiliary, the feature difference value of the pixel position (x, y) is modified as follows:

$$Cost(x, y) = \{Diff(x, y) + Diff(x-1, y-1) + Diff(x-1, y) + Diff(x-1, y+1) + Diff(x, y-1) + Diff(x, y+1) + Diff(x+1, y-1) + Diff(x+1, y) + Diff(x+1, y+1)\},$$

where Cost(x, y) indicates a corrected or an accurate feature difference value of the pixel position (x, y). Further, when one neighboring pixel position locates outside the overlapping area, it is omitted. Thus, the erroneous determination on the optimal dynamic seam route can be reduced. More detail is described herein. As shown in FIG. 4(d), in step S44, the auxiliary feature difference calculating module 322 calculates the feature difference value of one pixel position 45 and adds the feature difference values of the nine neighboring pixel positions to it so as to have a more accurate feature difference value for final output. It is noted that taking the nine neighboring pixel position is for illustrative purpose only, but not limited to it.

Figure 5A:
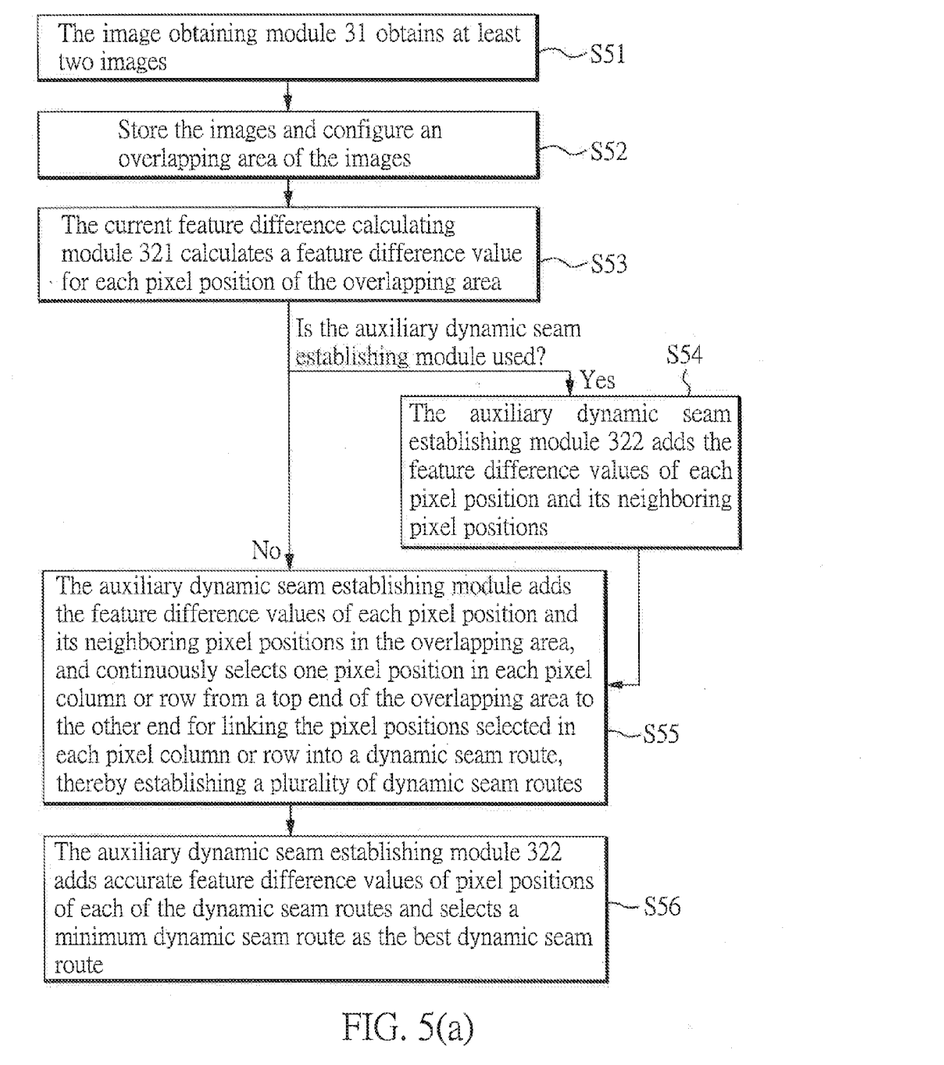
FIG. 5(a) is a flowchart of an optimal dynamic seam adjustment method for still image stitching according to another embodiment of the invention.
Figure 5B:
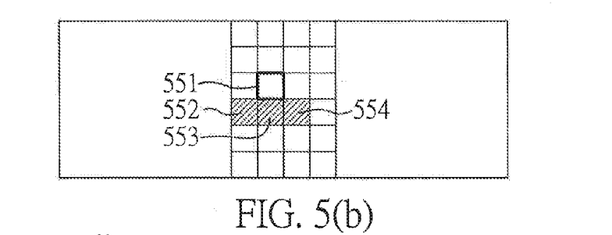
FIG. 5(b) is a schematic diagram of accurate feature difference values of pixel positions of FIG. 5(a) according to another embodiment of the invention.

FIG. 5(a) is a flowchart of an optimal dynamic seam adjustment method for still image stitching according to a second embodiment of the invention. As shown in FIGS. 3 and 5(a), the flowchart is essentially suitable for a still image stitching, and preferably performed by an image processor 34. For clear description of the invention, the image processor 34 is used to execute the steps of the method, but the invention is not limited to it. Steps S51-S54 of FIG. 5(a) are identical to steps S41-S44 of FIG. 4(a), and thus a detailed description therefor is deemed unnecessary. This embodiment is different in steps S55 and S56 with compared to the first embodiment. In step S55, the image processor 34 uses the auxiliary dynamic seam establishing module 333 of the dynamic seam module 33 to continuously select one pixel position in each pixel column or row from one side of the overlapping area to the other side and to add the feature difference value of the pixel position and a minimum feature difference value of one of the neighboring pixel positions for obtaining an accurate feature difference value of the pixel position. The neighboring pixel positions are preferably k pixel positions neighboring the pixel position in a next pixel column or row, where k is a positive integer. When one neighboring pixel position locates outside the overlapping area, it is omitted. For example, if the pixel position is indicated by (x, 0) and in the bottom pixel row of the overlapping area, and k=3, the accurate feature difference value of the pixel position (x, 0) is expressed as:

$$Diff2(x,0)=Diff(x,0)+\min\{Diff(x-1,1),Diff(x,1),Diff(x+1,1)\},$$

where Diff2(x, 0) indicates the accurate feature difference value of the pixel position (x, 0). For detail description of an example shown in FIG. 5(b), if a pixel position 551 is currently calculated, the auxiliary dynamic seam establishing module 333 adds the feature difference value of the pixel position 551 and a minimum feature difference value of one of three pixel positions 552-554 neighboring the pixel position 551 in a next row to obtain the accurate feature difference value of the pixel position 551. It is noted that taking the three neighboring pixel positions is for illustrative purpose only, but not limited to it.

Next, the selecting operation is repeated toward the other side of the overlapping area. Thus, one pixel position in every column or row from one side of the overlapping area to the other side is selected, and the accurate feature difference values of the pixel positions are calculated, such that the pixel positions selected in every pixel column or row are linked into one dynamic seam route. Referring to FIG. 4(c) again, the overlapping area is considered as six pixel rows, each row having four pixel positions, so that the auxiliary dynamic seam establishing module 333 can take one pixel position from each of the six pixel rows to obtain six pixel positions and form one dynamic seam route. Next, step S56 is executed such that the image processor 34 uses the optimal seam selecting module 332 to add the accurate feature difference values of the pixel positions of each of the dynamic seam routes and select one dynamic seam route with a minimum sum of the feature difference values of the pixel positions for use as the optimal dynamic seam route. Referring to FIG. 4(c) again, if one dynamic seam route comprised of pixel positions has a minimum sum of the accurate feature difference values among all the dynamic seam routes, said dynamic seam route is regarded as the optimal dynamic seam route. Therefore, the second embodiment of the invention is accomplished.

In addition, in the second embodiment, step S54, which is similar to step S44, can be inserted after step S53. If step S54 is inserted, the accurate feature difference value of the pixel position (x, 0) in steps S55 and S56 is modified as:

$$Cost2(x,0)=Cost(x,0)+\min\{Cost(x-1,1),Cost(x,1),Cost(x+1,1)\},$$

where Cost2(x, 0) indicates an accurate feature difference value after the auxiliary feature difference calculating module 322 is used for correction.

Figure 6:
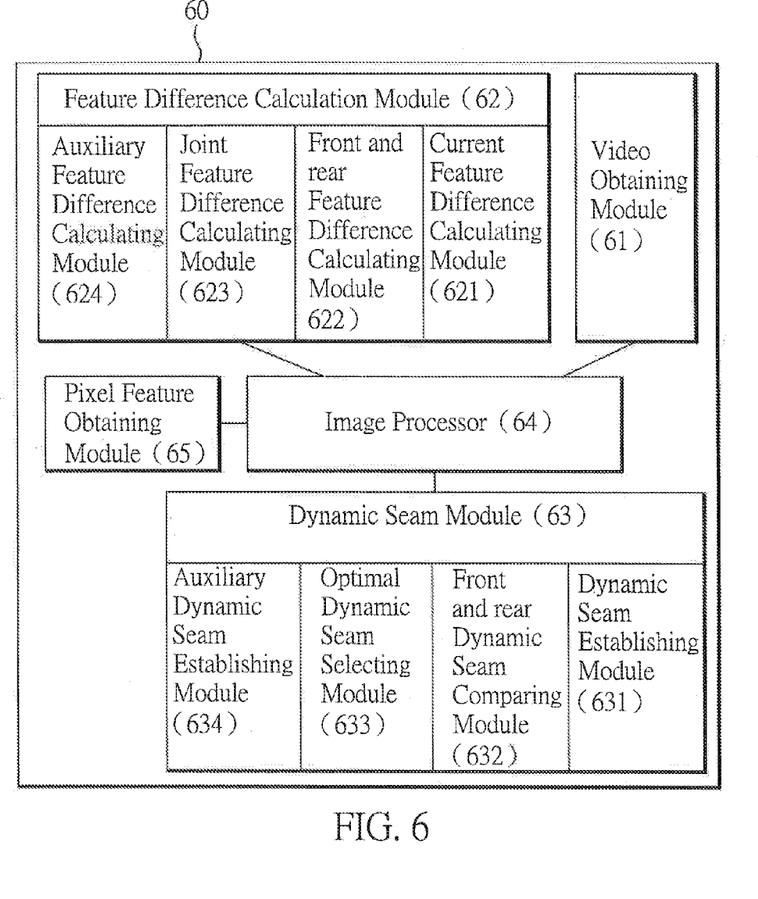
FIG. 6 is a schematic diagram of an optimal dynamic seam adjustment system for dynamic video stitching according to an embodiment of the invention.

FIG. 6 is a schematic diagram of an optimal dynamic seam adjustment system 60 according to another embodiment of the invention. The system is essentially used to stitch dynamic videos, including a video obtaining module 61, a feature difference calculation module 62, a dynamic seam module 63, an image processor 64, and a pixel feature obtaining module 65. The image processor 64 is connected to or comprises all the modules for controlling their operations.

The video obtaining module 61 is preferably a video camera or an input interface. When the module 61 is a video camera, at least two videos to be stitched are taken by the video camera. When the module 61 is an input interface, the input interface has an input end, such that the image processor 64 can use the input end to obtain at least two video files to be stitched. Each video can be divided into a plurality of images on a time axis, such that the video stitching can be regarded as several image sets to be stitched.

The feature difference calculation module 62 is performed by the image processor 64 for allowing the system 60 to calculate a feature difference value of the images. The feature difference calculation module 62 has a current feature difference calculating module 621, a front and rear feature difference calculating module 622, a joint feature difference calculating module 623, and an auxiliary feature difference calculating module 624 for proceeding with its operations.

The dynamic seam module 63 is performed by the image processor 64 for allowing the system 60 to establish or find one or more dynamic seam routes in the images. The module 63 has a dynamic seam establishing module 631 for establishing a plurality of dynamic seam routes, a front and rear dynamic seam comparing module 632, an optimal dynamic seam selecting module 633 for selecting an optimal dynamic seam route from the established or found dynamic seam routes, and an auxiliary dynamic seam establishing module 634.

The configuration of the modules is for illustrative purpose only, but not limited to it. Alternatively, the modules can be integrated into one module.

Figure 7A:
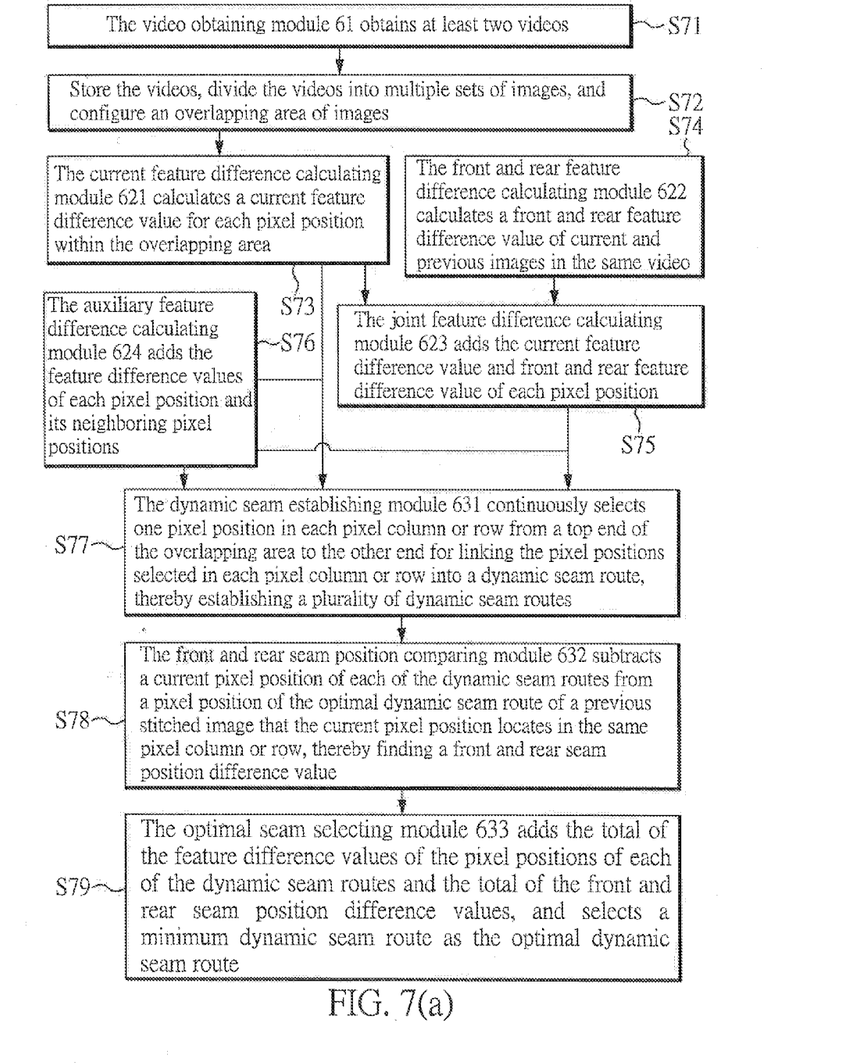
FIG. 7(a) is a flowchart of an optimal dynamic seam adjustment method for dynamic video stitching according to an embodiment of the invention.

FIG. 7(a) is a flowchart of an optimal dynamic seam adjustment method according to a third embodiment of the invention. As shown in FIGS. 6 and 7(a), the flowchart is suitable for a dynamic video stitching and preferably performed by the image processor 64. For clear description, the image processor 64 is used to perform the flowchart as follows, but the invention is not limited to it. First, step S71 is executed such that the image processor 64 uses the video obtaining module 61 to obtain at least two videos to be stitched. Each video can be divided into a plurality of images on a time axis. Accordingly, the video stitching can be regarded as several image sets to be stitched. Each image set has at least one overlapping area of the same size. The overlapping area can be divided into a plurality of pixels arranged in a plurality of pixel columns and rows. The video obtaining process is referred to the aforementioned description. In this step, selecting and optimizing the overlapping area is not critical in the invention, so that the overlapping area in the invention is treated as a determined region.

Figure 7B:
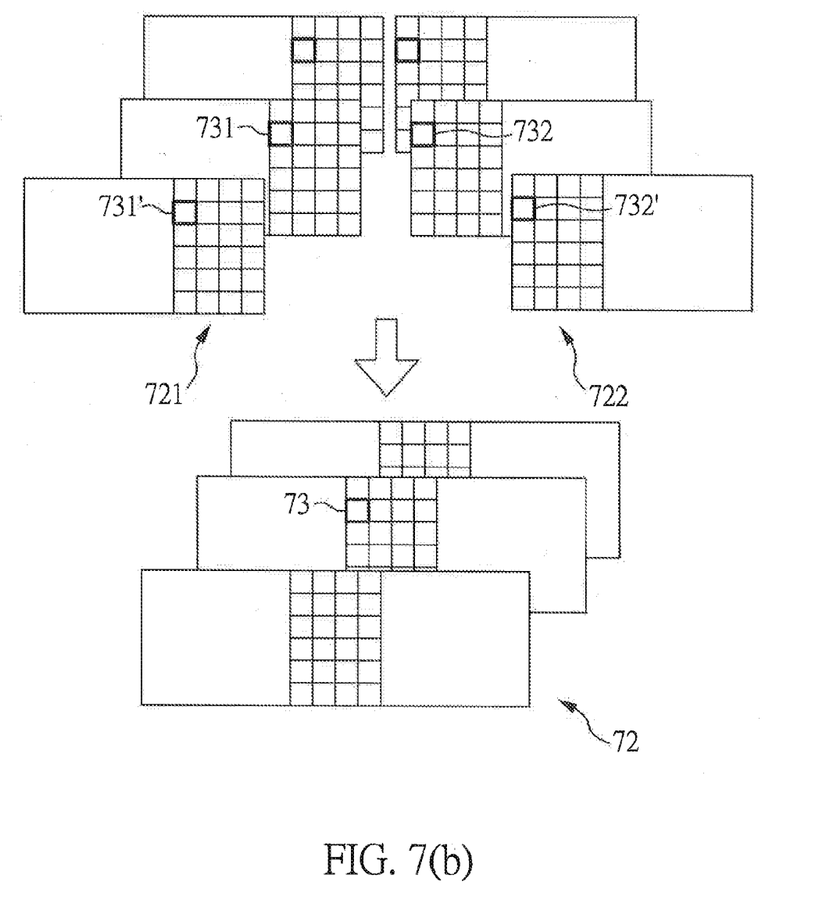
FIG. 7(b) is a schematic chart of stitching dynamic videos of FIG. 7(a) according to an embodiment of the invention.

After the videos to be stitched are obtained, the image processor 64 stores the videos (several image sets) (S72), and step S73 is executed such that the image processor 64 uses the feature difference calculation module 62 to calculate a feature difference value for each pixel position within the overlapping area of each of the plural image sets. The feature difference value indicates a pixel's luminance or chrominance, or other differentiable features. Further, the image processor 64 uses the pixel feature obtaining module 65 to obtain and store a feature of the pixel on each pixel position within the overlapping area of each image set. Next, the image processor 64 performs step S73 wherein the current feature difference calculating module 621 of the feature difference calculation module 62 calculates a current feature difference value for each pixel position within the overlapping area. For example, as shown in FIG. 7(b), if there are two videos to be stitched, each video having a plurality of images, into a plurality of stitched images, and each stitched image is formed by stitching two images at left and right, with an overlapping area. The overlapping area in each stitched image has the same size. For example, if a stitched image currently processing has the overlapping area 72, i.e., an overlapping of a right area 721 in the left image and a left area 722 in the right image. The overlapping area 72 contains a plurality of pixel positions, such as a pixel position 73, and in this case each of the pixel positions 731 and 732 corresponding to the pixel position 73 in the respective left and right images has a pixel and a feature value of the pixel. Accordingly, the current feature difference calculating module 621 calculates the feature values of the two pixels in order to obtain a feature difference value of the left pixel 731 and right pixel 732 on the pixel position 73. Namely, the current feature difference calculating module 621 calculates a current feature difference value for each pixel in position corresponding to that in two images based on the following equation:

$$\text{Diff}(x,y)=|Y\_curL(x,y)-Y\_curR(x,y)|,$$

where Diff(x, y) indicates a current feature difference value on a (x, y) position in an overlapping area, Y_curL(x, y) indicates a current feature value of a pixel on the (x, y) position in the overlapping area of a left image, and Y_curR (x, y) indicates a current feature value of a pixel on the (x, y) position in the overlapping area of a right image. In this embodiment, the current feature difference value is used as a feature value of the pixel on the (x, y) position, such that the image processor 64 can obtain the feature difference values on each position in the overlapping area. In addition, the invention is not limited to the left and right video stitching. Alternatively, an upper and lower video stitching can alto be performed.

In addition, the image processor 64 performs step S74 where the front and rear feature difference calculating module 622 of the video obtaining module 62 calculates a front and rear feature difference value in the same video (i.e., the feature difference of a current image and a previous image) for each pixel position of the overlapping area. Similarly, with reference to FIG. 7(b), the front and rear feature difference calculating module 622 subtracts the feature value of the pixel position 731' corresponding to the pixel position 73 in a current left image from the feature value of the pixel position 731 corresponding to the pixel position 73 in a previous left image so as to obtain a front and rear feature difference value of the pixel position 731 in the current left image. Also, the front and rear feature difference calculating module 622 subtracts the feature value of the pixel position 732' corresponding to the pixel position 73 in a current right image from the feature value of the pixel position 732 corresponding to the pixel position 73 in a previous right image so as to obtain a front and rear feature difference value of the pixel position 732 in the current right image. Next, the front and rear feature difference values in the current left image and the current right image are combined to obtain a front and rear feature difference value of the pixel position 73. Namely, the front and rear feature difference calculating module 622 is based on the following equation to calculate a front and rear feature difference value for each pixel position of two images to be stitched:

$$D(x,y)=|YcurL(x,y)-YpreL(x,y)|+|YcurR(x,y)-YpreR(x,y)|;$$

where D(x, y) indicates a front and rear feature difference value of the pixel position, YcurL(x, y) indicates a feature value of a pixel position (x, y) in a current left image to be stitched, YpreL(x, y) indicates a feature value of the pixel position (x, y) in a previous left image to be stitched, YcurR(x, y) indicates a feature value of the pixel position (x, y) in a current right image to be stitched, and YpreR(x, y) indicates a feature value of the pixel position (x, y) in a previous right image to be stitched. When the currently processed image is the first image, YpreL(x, y) and YpreR(x, y) in this case are set to zero.

After the current feature difference values and the front and rear feature difference values are obtained, the image processor 64 performs step S75 where the joint feature difference calculating module 623 combines the current feature difference value and front and rear feature difference value of each pixel position into a joint feature difference value, i.e., D(x, y)+D(x, y). The joint feature difference value is used as the feature difference value of the pixel position. In other embodiments, the current feature difference value Diff(x, y) or the front and rear feature difference value D(x, y) can be used as the feature difference value of the pixel position.

Figure 7C:
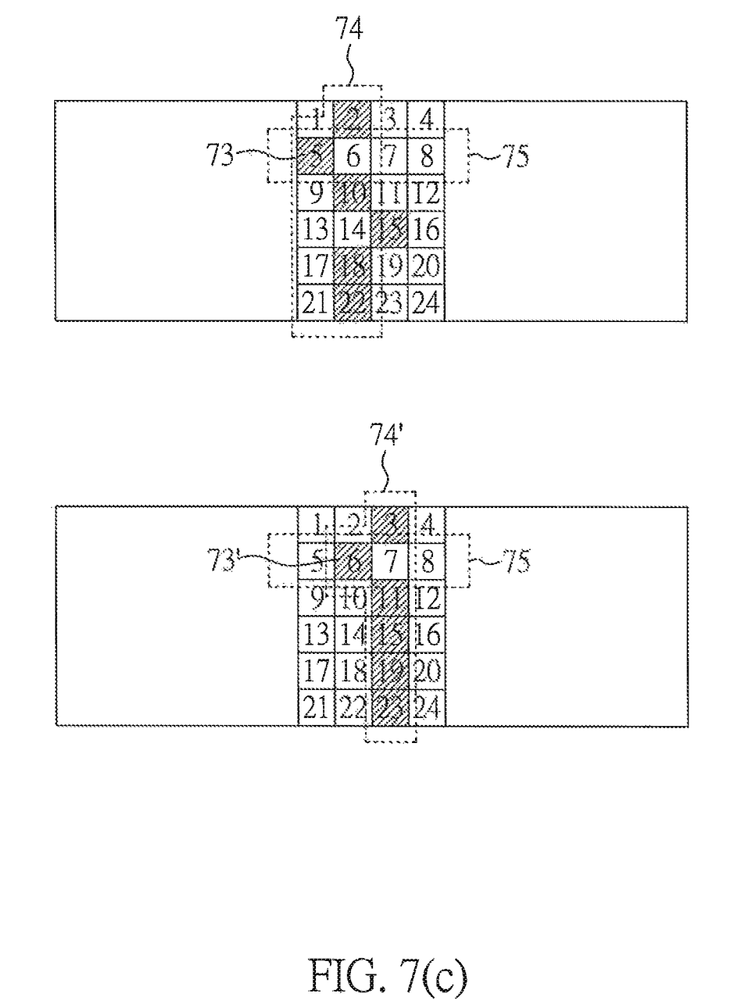
FIG. 7(c) is a schematic diagram of a current dynamic seam route and a previous optimal dynamic seam route of FIG. 7(a) according to an embodiment of the invention.

After the feature difference values of each pixel position in the overlapping area are obtained, step S77 is executed such that the image processor 64 uses the dynamic seam establishing module 631 of the dynamic seam module 63 to continuously select one pixel position in each pixel column or row from one side of the overlapping area to the other side, thereby linking the pixel positions selected in each pixel column or row into a dynamic seam route, as shown in FIG. 7(c). Thus, the dynamic seam establishing module 631 can establish a plurality of dynamic seam routes. Next, step S78 is executed such that, for an example of a dynamic seam route 74 shown in FIG. 7(c), the image processor 64 uses the front and rear seam position comparing module 632 to perform a subtraction operation in order to compare a current pixel position of each of the dynamic seam routes with a pixel position of the optimal dynamic seam route of a previous stitched image that the current pixel position locates in the same pixel column or row, thereby finding a front and rear seam position difference value. It is considered because a discontinuity of frame stitching can be present when the difference of two dynamic seam positions respectively of current and previous stitched images is too large. Thus, when the subtracted result is small, it indicates that the difference of two dynamic seam positions respectively of current and previous stitched images is small so as not to cause the frame stitching discontinuity. For detailed description of an example, as shown in FIG. 7(c), each pixel on the overlapping area 72 has one position value, such as a position value of 5 to indicate one pixel position 73 of a pixel row 75 of the dynamic seam route 74 in a current stitched image and a position value of 6 to indicate a pixel position 73' corresponding to the pixel row 75 of the best dynamic seam route 74', and in this case the front and rear seam position difference value of the pixel position 73 is one (|5-6|). The cited position values are for illustrative purpose only, and the invention can use another representation to identify the pixel positions.

Next, step S79 is executed such that the optimal seam selecting module 633 of the dynamic seam module 63 adds the total of the feature difference values of the pixel positions of each of the dynamic seam routes and the total of the front and rear seam position difference values, and thus a minimum dynamic seam route is selected as the optimal dynamic seam route, so as to accomplish the third embodiment of the invention.

In addition, in this embodiment, step S76 can be inserted after steps S73, S75 so as to have a more accurate feature difference value. The image processor 64 uses the auxiliary feature difference calculating module 624 of the feature difference calculation module 62 to add the feature difference values of each pixel position and its neighboring pixel positions in the overlapping area to obtain an added result for use as the basis of steps S77 and S79 in calculation. The neighboring pixel positions are preferably the n×n neighboring pixel positions centered at the pixel position as auxiliary in calculating the feature difference value, where n is an odd number. For example, suppose that the pixel position (x, y) is targeted and the 3×3 neighboring pixel positions are used as auxiliary, the feature difference value of the pixel position (x, y) is modified as follows:

$$Cost(x, y) = \{Diff(x, y) + Diff(x-1, y-1) + Diff(x-1, y) + Diff(x-1, y+1) + Diff(x, y-1) + Diff(x, y+1) + Diff(x+1, y-1) + Diff(x+1, y) + Diff(x+1, y+1)\},$$

where Cost(x, y) indicates a corrected or an accurate feature difference value of the pixel position (x, y). Further, when one neighboring pixel position locates outside the overlapping area, it is omitted. Thus, the erroneous determination on the optimal dynamic seam route can be reduced, as shown in the schematic diagram of FIG. 4(d).

Figure 8A:
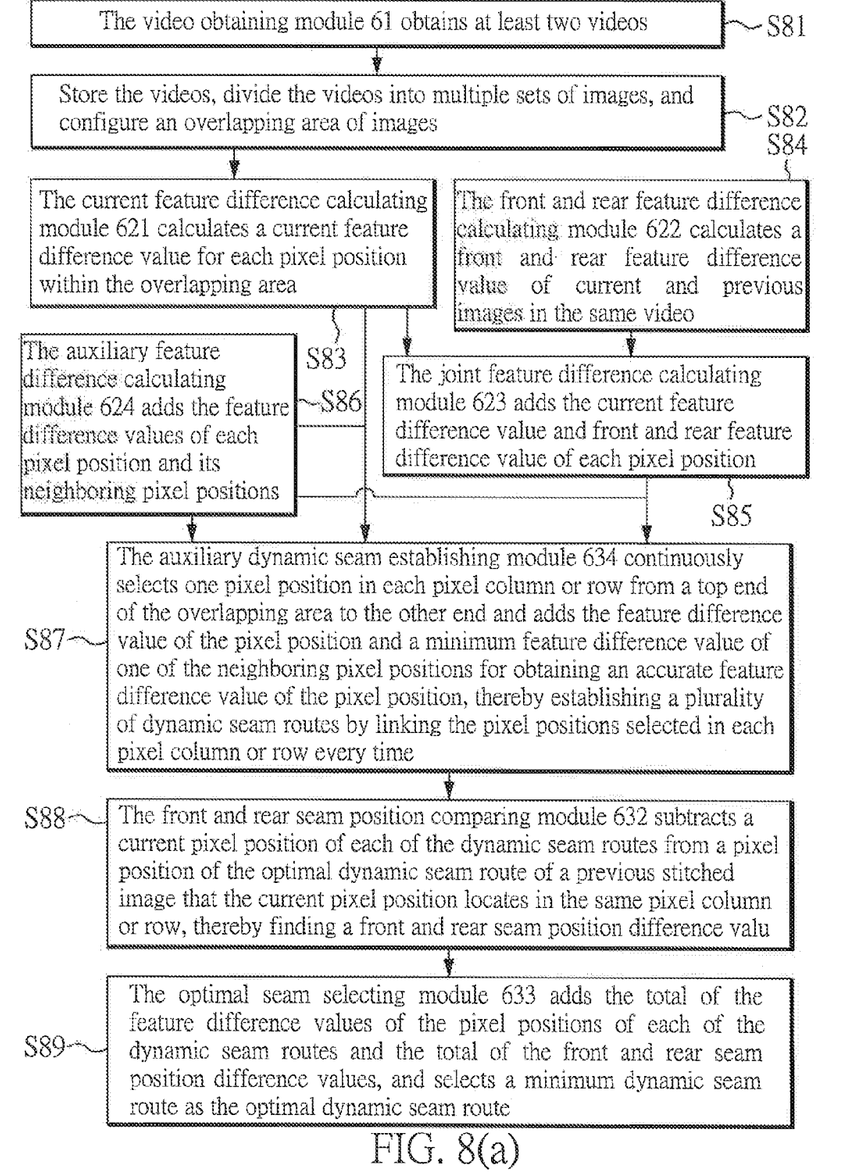
FIG. 8(a) is a flowchart of an optimal dynamic seam adjustment method for dynamic video stitching according to another embodiment of the invention.
Figure 8B:
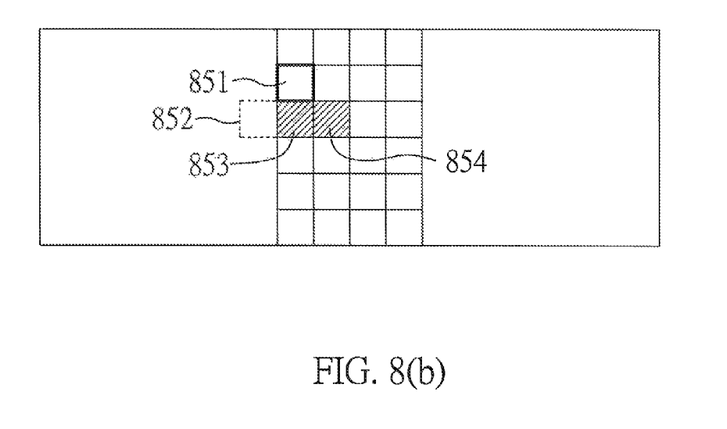
FIG. 8(b) is a schematic diagram of accurate feature difference values of pixel positions of FIG. 8(a) according to another embodiment of the invention.

FIG. 8(a) is a flowchart of a fourth embodiment of the invention. As shown in FIGS. 6 and 8(a), the flowchart is suitable for a dynamic video stitching and preferably performed by an image processor 64. For clear description of the invention, the image processor 34 is used to execute the steps of the method, but the invention is not limited to it. Steps S81-S86 and S88 are identical to steps S71-S76 and S78 of FIG. 4(a), and thus a detailed description therefor is deemed unnecessary. This embodiment is different in steps S87 and S89 with compared to the third embodiment. In step S87, the image processor 64 uses the auxiliary dynamic seam establishing module 634 of the dynamic seam module 63 to continuously select one pixel position in each pixel column or row from one side of the overlapping area to the other side and to add the feature difference value of the pixel position and a minimum feature difference value of one of the neighboring pixel positions for obtaining a corrected or an accurate feature difference value of the pixel position, thereby establishing a plurality of dynamic seam routes by linking the selected pixel positions. The neighboring pixel positions are preferably k pixel positions neighboring the pixel position in a next pixel column or row, where k is a positive integer. When one neighboring pixel position locates outside the overlapping area, it is omitted. For example, if the pixel position is indicated by (x, 0) and k=3, the accurate feature difference value of the pixel position (x, 0) is expressed as:

$$Diff4(x,0)=Diff(x,0)+\min\{Diff(x-1,1),Diff(x,1),Diff(x+1,1)\},$$

where Diff4(x, 0) indicates an accurate feature difference value of the pixel position (x, 0). For detail description of an example shown in FIG. 8(b), if a pixel position 851 is currently calculated, the auxiliary dynamic seam establishing module 634 adds the feature difference value of the pixel position 851 and a minimum feature difference value of one of three pixel positions 852-854 neighboring the pixel position 851 in a next row to obtain the accurate feature difference value of the pixel position 851. In this case, the pixel position 852 outside the overlapping area 85 is omitted, so only the pixel positions 853, 854 are actually used, and one with the smaller feature difference value is selected and added to the feature difference value of the pixel position 851. It is noted that taking the three neighboring pixel positions is for illustrative purpose only, but not limited to it.

Next, the selecting operation is repeated toward the other side of the overlapping area. Thus, one pixel position in every column or row from one side of the overlapping area to the other side is selected, and the accurate feature difference values of the pixel positions are calculated, such that the pixel positions selected in each pixel column or row are linked into one dynamic seam route. Next, step S89 is executed such that the optimal seam selecting module 633 adds the total of the accurate feature difference values of the pixel positions of each of the dynamic seam routes and the total of the front and rear seam position difference values so as to select one dynamic seam route with a minimum sum of the feature difference values of the pixel positions as the optimal dynamic seam route, so as to accomplish the fourth embodiment of the invention.

In addition, in the fourth embodiment, step S86, which is similar to step S76, can be inserted after step S83 and S85. If step S86 is added, the accurate feature difference value of the pixel position (x, 0) in steps S87-S89 is modified as:

$$Cost4(x,0)=Cost(x,0)+\min\{Cost(x-1,1),Cost(x,1),Cost(x+1,1)\},$$

where Cost4(x, 0) indicates an accurate feature difference value after the auxiliary feature difference calculating module 624 is used for correction.

Figure 9:
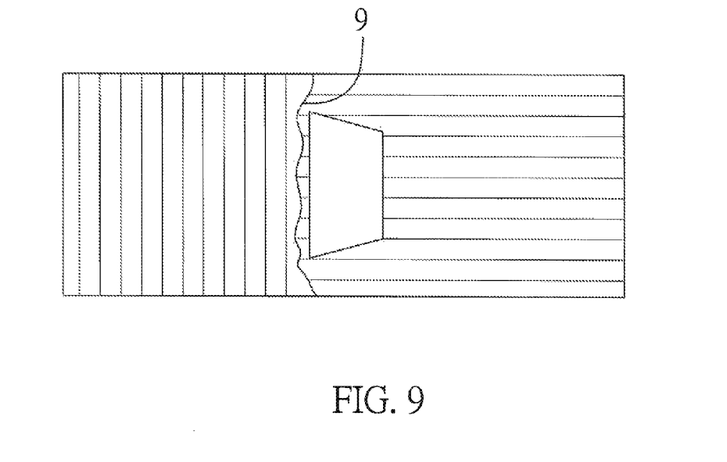
FIG. 9 is a schematic view of a result of image stitching according to the invention.

After the optimal dynamic seam route is obtained, as shown in FIG. 9, the best dynamic seam route 9 is used as a boundary of two stitched frames, and accordingly the fine stitching effect is achieved.

Although the present invention has been explained in relation to its preferred embodiment, it is to be understood that many other possible modifications and variations can be made without departing from the spirit and scope of the invention as hereinafter claimed.

What is claimed is:

1. An optimal dynamic seam adjustment system for image stitching, comprising:
    an image obtaining module for obtaining at least two images to be stitched, wherein the images to be stitched have at least one overlapping area and the overlapping area is divided into a plurality of pixels arranged in a plurality of pixel columns and a plurality of pixel rows;
    a feature difference calculation module for calculating a feature difference value for each pixel within the overlapping area; and
    a dynamic seam module for establishing a plurality of dynamic seam routes started from a top end of the overlapping area, so as to find an optimal dynamic seam route based on the feature difference value, wherein each dynamic seam route is composed of a plurality of pixels,
    wherein the dynamic seam module comprises a dynamic seam establishing module for continuously selecting one pixel position in each column or row from the top end of the overlapping area to the other end and linking the pixel positions selected in each pixel column or row into a dynamic seam route, thereby establishing the plurality of dynamic seam routes; and an optimal dynamic seam selecting module for adding the feature difference values of each pixel position in each of the dynamic routes and selecting a minimum dynamic seam route as the optimal dynamic seam route.

2. The optimal dynamic seam adjustment system as claimed in claim 1, wherein the feature difference calculation module comprises a current feature difference calculating module for calculating the feature difference values of each pixel position within the overlapping area of the at least two images to be stitched.

3. The optimal dynamic seam adjustment system as claimed in claim 2, wherein the feature difference calculation module further comprises an auxiliary feature difference calculating module for adding the feature difference values of each pixel position and its neighboring pixel positions in the overlapping area.

4. The optimal dynamic seam adjustment system as claimed in claim 1, wherein the dynamic seam module comprises an auxiliary dynamic seam establishing module for adding the feature difference values of each pixel position and its neighboring pixel positions into an accurate feature difference value so as to establish the plurality of dynamic seam routes.

5. The optimal dynamic seam adjustment system as claimed in claim 4, wherein the dynamic seam module further comprises an optimal dynamic seam selecting module for adding the accurate feature difference values of each pixel position in each of the dynamic routes and selecting a minimum dynamic seam route for use as the optimal dynamic seam route.

6. An optimal dynamic seam adjustment system for image stitching, comprising:
    a video obtaining module for obtaining at least two videos to be stitched, wherein each video has a plurality of images so as to stitch several image sets, each image set having at least one overlapping area of the same size, the overlapping area being divided into a plurality of pixels arranged in a plurality of columns and a plurality of rows;
    a feature difference calculation module for calculating a feature difference value for each pixel position within the overlapping area of a current image set to be stitched; and
    a dynamic seam module for establishing a plurality of dynamic seam routes started from a top end of the overlapping area of the current image set to be stitched, so as to find an optimal dynamic seam route based on the feature difference value of the current image set to be stitched and the optimal dynamic seam route of a previous stitched image set, wherein each dynamic seam route is composed of a plurality of pixels,
    wherein the dynamic seam module comprises a dynamic seam establishing module for continuously selecting one pixel position in each column or row from the top end of the overlapping area to the other end and linking the pixel positions selected in each pixel column or row into a dynamic seam route, thereby establishing the plurality of dynamic seam routes; a front and rear seam position comparing module for comparing a current pixel position of each of the dynamic seam routes with a pixel position of the optimal dynamic seam route of a previous stitched image that the current pixel position locates in the same pixel column or row, thereby finding a front and rear seam position difference value; and an optimal seam selecting module for adding a total of the feature difference values of the pixel positions of each of the dynamic seam routes and a total of the front and rear seam position difference values and selecting a minimum dynamic seam route as the optimal dynamic seam route.

7. The optimal dynamic seam adjustment system as claimed in claim 6, wherein the feature difference calculation module comprises a current feature difference calculating module for calculating a current feature difference value for each pixel position within the overlapping area of at least two images to be stitched of the at least two videos and using the current feature difference value as the feature difference value.

8. The optimal dynamic seam adjustment system as claimed in claim 7, wherein the feature difference calculation module further comprises a front and rear seam position comparing module for finding a front and rear seam position difference value for each pixel position within the overlapping area of a current image and a previous image in the same video.

9. The optimal dynamic seam adjustment system as claimed in claim 8, wherein the feature difference calculation module further comprises a joint feature difference calculating module for adding the current feature difference value and front and rear feature difference value of each pixel position into a joint feature difference value and replacing the feature difference value with the joint feature difference value.

10. The optimal dynamic seam adjustment system as claimed in claim 9, wherein the feature difference calculation module further comprises an auxiliary feature difference calculating module for adding the feature difference values of each pixel position and its neighboring pixel positions so as to reduce an erroneous determination.

11. The optimal dynamic seam adjustment system as claimed in claim 6, wherein the dynamic seam module further comprises an auxiliary dynamic seam establishing module for adding the feature difference values of each pixel position and its neighboring pixel positions into an accurate feature difference value so as to establish the plurality of dynamic seam routes.

12. The optimal dynamic seam adjustment system as claimed in claim 11, wherein the dynamic seam module further comprises a front and rear seam position comparing module for comparing a current pixel position of each of the dynamic seam routes with a pixel position of the optimal dynamic seam route of a previous stitched image that the current pixel position locates in the same pixel column or row, thereby finding a front and rear seam position difference value.

13. The optimal dynamic seam adjustment system as claimed in claim 12, wherein the dynamic seam module further comprises an optimal seam selecting module for adding a total of the accurate feature difference values of the pixel positions of each of the dynamic seam routes and a total of the front and rear seam position difference values and selecting a minimum dynamic seam route as the optimal dynamic seam route.

14. An optimal dynamic seam adjustment method for image stitching, which is performed by an image processor to control an image obtaining module, a feature difference calculation module, and a dynamic seam module for operation, comprising the steps of:
(A) using the image obtaining module to obtain at least two images to be stitched, wherein the images to be stitched have at least one overlapping area and the overlapping area is divided into a plurality of pixels arranged in a plurality of pixel columns and a plurality of pixel rows;
(B) using the feature difference calculation module to calculate a feature difference value for each pixel within the overlapping area; and
(C) using the dynamic seam module to establish a plurality of dynamic seam routes started from a top end of the overlapping area, so as to find an optimal dynamic seam route based on the feature difference value, wherein each dynamic seam route is composed of a plurality of pixels,
wherein step (C) further comprises: using a dynamic seam establishing module of the dynamic seam module to continuously select one pixel position in each column or row from the top end of the overlapping area to the other end and link the pixel positions selected in each pixel column or row into a dynamic seam route, thereby establishing the plurality of dynamic seam routes; and using an optimal dynamic seam selecting module of the dynamic seam module to add the feature difference values of each pixel position in each of the dynamic routes and select a minimum dynamic seam route as the optimal dynamic seam route.

15. The optimal dynamic seam adjustment method as claimed in claim 14, wherein step (B) further comprises: using a current feature difference calculating module of the feature difference calculation module to calculate the feature difference values of each pixel position within the overlapping area of the at least two images to be stitched.

16. The optimal dynamic seam adjustment method as claimed in claim 15, wherein step (B) further comprises: using an auxiliary feature difference calculating module of the feature difference calculation module to add the feature difference values of each pixel position and its neighboring pixel positions so as to reduce an erroneous determination.

17. The optimal dynamic seam adjustment method as claimed in claim 14, wherein step (C) further comprises: using an auxiliary dynamic seam establishing module of the dynamic seam module to add the feature difference values of each pixel position and its neighboring pixel positions into an accurate feature difference value so as to establish the plurality of dynamic seam routes.

18. The optimal dynamic seam adjustment method as claimed in claim 17, wherein step (C) further comprises: using an optimal dynamic seam selecting module of the dynamic seam module to add the accurate feature difference values of each pixel position in each of the dynamic routes and select a minimum dynamic seam route as the optimal dynamic seam route.

19. An optimal dynamic seam adjustment method for image stitching, which is performed by an image processor to control a video obtaining module, a feature difference calculation module, and a dynamic seam module for operation, comprising the steps of:
(A) using the video obtaining module to obtain at least two videos to be stitched, wherein each video has a plurality of images so as to stitch several image sets, each image having at least one overlapping area of the same size, the overlapping area being divided into a plurality of pixels arranged in a plurality of columns and a plurality of rows;
(B) using the feature difference calculation module to calculate a first feature difference value for each pixel position within the overlapping area of a current image set to be stitched; and
(C) using the dynamic seam module to establish a plurality of dynamic seam routes started from a top end of the overlapping area of the current image set to be stitched, so as to find an optimal dynamic seam route based on the feature difference value of the current image set to be stitched and the optimal dynamic seam route of a previous stitched image set, wherein each dynamic seam route is composed of a plurality of pixels,
wherein step (C) further comprises: using a front and rear seam position comparing module of the dynamic seam module to compare a current pixel position of each of the dynamic seam routes with a pixel position of the optimal dynamic seam route of a previous stitched picture that the current pixel position locates in the same pixel column or row, thereby finding a front and rear seam position difference value; and using an optimal seam selecting module of the dynamic seam module to add a total of the feature difference values of the pixel positions of each of the dynamic seam routes and a total of the front and rear seam position difference values and select a minimum dynamic seam route as the optimal dynamic seam route.

20. The optimal dynamic seam adjustment method as claimed in claim 19, wherein step (B) further comprises: using a current feature difference calculating module of the feature difference calculation module to calculate a current feature difference value for each pixel position within the overlapping area of at least two images to be stitched of the at least two videos.

21. The optimal dynamic seam adjustment method as claimed in claim 20, wherein step (B) further comprises: using a front and rear seam position comparing module of the feature difference calculation module to find a front and rear seam position difference value for each pixel position within the overlapping area of a current image and a previous image in the same video.

22. The optimal dynamic seam adjustment method as claimed in claim 21, wherein step (B) further comprises: using a joint feature difference calculating module of the feature difference calculation module to add the current feature difference value and front and rear feature difference value of each pixel position into a joint feature difference value and configuring the joint feature difference value as the feature difference value.

23. The optimal dynamic seam adjustment method as claimed in claim 22, wherein step (B) further comprises: using an auxiliary feature difference calculating module of the feature difference calculation module to add the first feature difference value of each pixel position and its neighboring pixel positions so as to reduce an erroneous determination.

24. The optimal dynamic seam adjustment method as claimed in claim 19, wherein step (C) further comprises: using a dynamic seam establishing module of the dynamic seam module to continuously select one pixel position in each column or row from the top end of the overlapping area to the other end and link the pixel positions selected in each pixel column or row into a dynamic seam route, thereby establishing the plurality of dynamic seam routes.

25. The optimal dynamic seam adjustment method as claimed in claim 19, wherein step (C) further comprises: using an auxiliary dynamic seam establishing module of the dynamic seam module to add the feature difference values of each pixel position and its neighboring pixel positions into an accurate feature difference value so as to establish the plurality of dynamic seam routes.

26. The optimal dynamic seam adjustment method as claimed in claim 19, wherein step (C) further comprises: using a front and rear seam position comparing module of the dynamic seam module to compare a current pixel position of each of the dynamic seam routes with a pixel position of the optimal dynamic seam route of a previous stitched image that the current pixel position locates in the same pixel column or row, thereby finding a front and rear seam position difference value.

27. The optimal dynamic seam adjustment method as claimed in claim 26, wherein step (C) further comprises: using an optimal seam selecting module of the dynamic seam module to add a total of the accurate feature difference values of the pixel positions of each of the dynamic seam routes and a total of the front and rear seam position difference values and select a minimum dynamic seam route as the optimal dynamic seam route.

* * * * *